United States Patent
Sarawate et al.

(10) Patent No.: US 8,777,563 B2
(45) Date of Patent: Jul. 15, 2014

(54) AXIAL BRUSH SEAL

(75) Inventors: Neelesh Nandkumar Sarawate, Niskayuna, NY (US); Norman Arnold Turnquist, Carlisle, NY (US); William Edward Adis, Scotia, NY (US); Robert Gerard Baran, Clifton Park, NY (US); Rodrigo Rodriguez Erdmenger, Bayern (DE); Robbert Christiaan Pannekeet, Bavaria (DE); Keith Michael Parker, Greer, SC (US); Xiaoqing Zheng, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 671 days.

(21) Appl. No.: 13/017,540

(22) Filed: Jan. 31, 2011

(65) Prior Publication Data

US 2012/0195741 A1 Aug. 2, 2012

(51) Int. Cl.
*F01D 11/08* (2006.01)
(52) U.S. Cl.
USPC ............ 415/174.2; 415/174.3; 415/231
(58) Field of Classification Search
USPC ........ 415/174.2, 174.3, 174.4, 229, 230, 231; 277/355, 411–412, 418–419
See application file for complete search history.

(56) References Cited

U.S. PATENT DOCUMENTS

| | | | |
|---|---|---|---|
| 5,114,159 A | 5/1992 | Baird et al. | |
| 5,328,328 A | 7/1994 | Charbonnel et al. | |
| 5,700,011 A * | 12/1997 | Bainachi et al. | 277/422 |
| 5,997,004 A | 12/1999 | Braun et al. | |
| 6,170,831 B1 | 1/2001 | Bouchard | |
| 6,622,490 B2 | 9/2003 | Ingistov | |
| 7,093,835 B2 | 8/2006 | Addis | |
| 7,168,708 B2 * | 1/2007 | Dalton et al. | 277/355 |
| 2003/0185675 A1 * | 10/2003 | Turnquist et al. | 415/178 |
| 2004/0041348 A1 | 3/2004 | Addis | |
| 2006/0088409 A1 * | 4/2006 | Bracken et al. | 415/170.1 |
| 2007/0132189 A1 * | 6/2007 | Short et al. | 277/355 |
| 2007/0132190 A1 | 6/2007 | Trabert | |

FOREIGN PATENT DOCUMENTS

| | | |
|---|---|---|
| EP | 1235010 B1 | 8/2007 |
| FR | 2785355 A1 | 5/2000 |
| GB | 2407626 A | 5/2005 |

OTHER PUBLICATIONS

Search Report and Written Opinion from corresponding PCT Application No. PCT/US2012/028986 dated Jun. 25, 2012.
Lattime, et al.; "Design Considerations Towards the Construction of Hybrid Floating Brush Seal (HFBS)"; Tribology International; vol. 37, No. 2 (2004); pp. 159-167.
Lattime, Scott Bryan, Ph. D; "A Hybrid Floating Brush Seal (HFBS) for Improved Sealing and Wear Performance in Turbomachinery Applications"; The University of Akron; 2000; 287 Pages.

* cited by examiner

*Primary Examiner* — Nathaniel Wiehe
*Assistant Examiner* — Adam W Brown
(74) *Attorney, Agent, or Firm* — Ann M. Agosti

(57) ABSTRACT

A brush seal assembly for turbomachinery having a rotor can include a stationary seal component, a floating seal component coupled to the stationary seal component and circumferentially angled bristles arranged in a bristle pack, disposed in the floating seal component and extended axially with respect to the rotor.

7 Claims, 4 Drawing Sheets

AXIAL BRUSH SEAL

BACKGROUND OF THE INVENTION

The subject matter disclosed herein relates to sealing structures in turbomachinery, and more particularly to floating axial brush seals.

Radial brush seals are an established technology in turbomachinery. Their implementation in power turbines can be limited by their tendency to influence rotordynamics in the power turbines through frictional heating of the rotor body. For example, non-uniform circumferential heating of the rotor can cause the rotor to bow introducing imbalance into the turbine affecting critical speeds. In addition, certain power turbines may not have enough space for radial brush seals.

What is needed is a brush seal that reduces rotor heating and can be implemented in a turbine with limited radial space.

BRIEF DESCRIPTION OF THE INVENTION

According to one aspect of the invention, a brush seal assembly for turbomachinery having a rotor is described. The assembly can include a stationary seal component, a floating seal component movably coupled to the stationary seal component, and circumferentially angled bristles arranged in a bristle pack, disposed in the floating seal component and extended axially with respect to the rotor.

According to another aspect of the invention, a power turbine is described. The power turbine can include a first turbine wheel, a second turbine wheel, a rotor disposed between and coupled to the first and second turbine wheels, a stator adjacent the rotor and an axial brush seal assembly, the axial bush seal that can include a stationary seal component coupled to the stator, a floating seal component coupled to the stationary seal component, circumferentially angled bristles arranged in a bristle pack, disposed in the floating seal component and extended axially with respect to the rotor and a radial brush seal assembly disposed between the stationary seal component and the floating seal component.

According to yet another aspect of the invention, a power turbine is described. The power turbine can include a first turbine wheel, a second turbine wheel, a rotor disposed between and coupled to the first and second turbine wheels, a stator adjacent the rotor, an axial brush seal assembly coupled to the stator, the axial bush seal that can include a stationary seal component, a floating seal component coupled to the stationary seal component, circumferentially angled bristles arranged in a bristle pack, disposed in the floating seal component and extended axially with respect to the rotor and a piston ring disposed between the stationary seal component and the floating seal component.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments described herein include floating axial brush seals. These seals can seal against wheel faces, thus avoiding frictional heating of the rotor body and eliminating effects on rotordynamics. The floating axial brush seals can be implemented with a combination of very high pressure drops in turbine wheel spaces across the seals (greater than or equal to 500 pounds per square inch differential (psid) (3.45 Newtons per square millimeter (N/mm$^2$))) and large relative axial movements (+/−0.5 inches (1.27 centimeters (cm))) between turbine rotating and stationary components. The floating axial brush seal has a structure that self-regulates to pressure changes in the wheel spaces at each stage of the power turbine. By adjusting to the axial position of the rotor and maintaining adequate bristle support to sustain high-pressure applications, the floating axial brush seals can enable the implementation of brush seals at every turbine stage.

Generally, a brush seal assembly comprises the stationary seal component having a recess configured to receive a portion of the floating seal component in a movable configuration. The floating seal component is coupled to the stationary seal component such that, during use, the floating seal component can move laterally and longitudinally, e.g., based upon pressure changes around the brush seal assembly. The general shape of the floating seal component is to facilitate the desired pressure adjacent each side of the floating seal assembly (e.g., to attain a pressure of $P_H > P_1 > P_2 > P_L$ (see FIG. 3)). As such, the brush seal assembly can have a size and geometry such that wheel space 191 is larger than wheel space 192.

Figure 1:
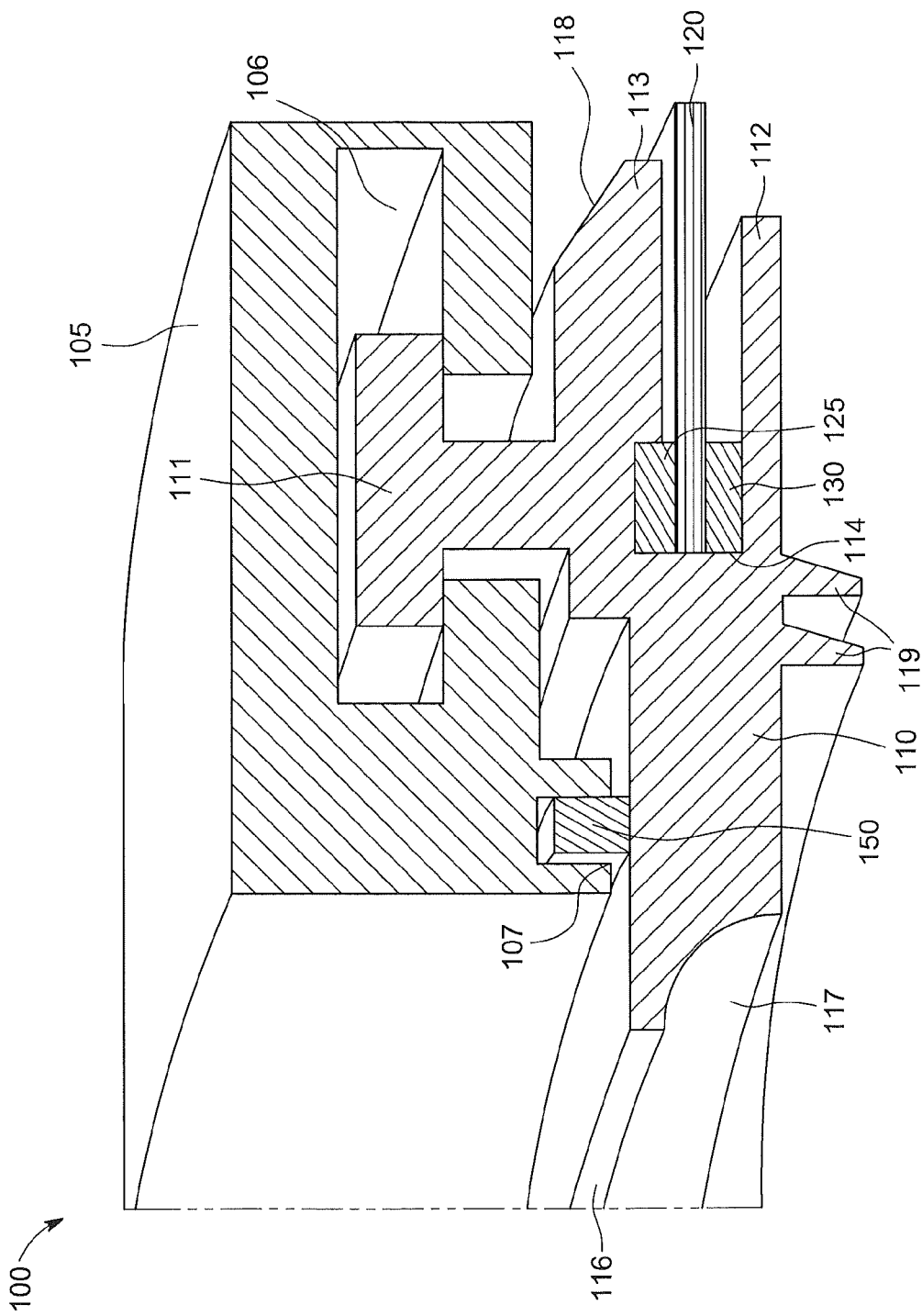
FIG. 1 illustrates a perspective side view of an exemplary axial brush seal assembly.
Figure 2:
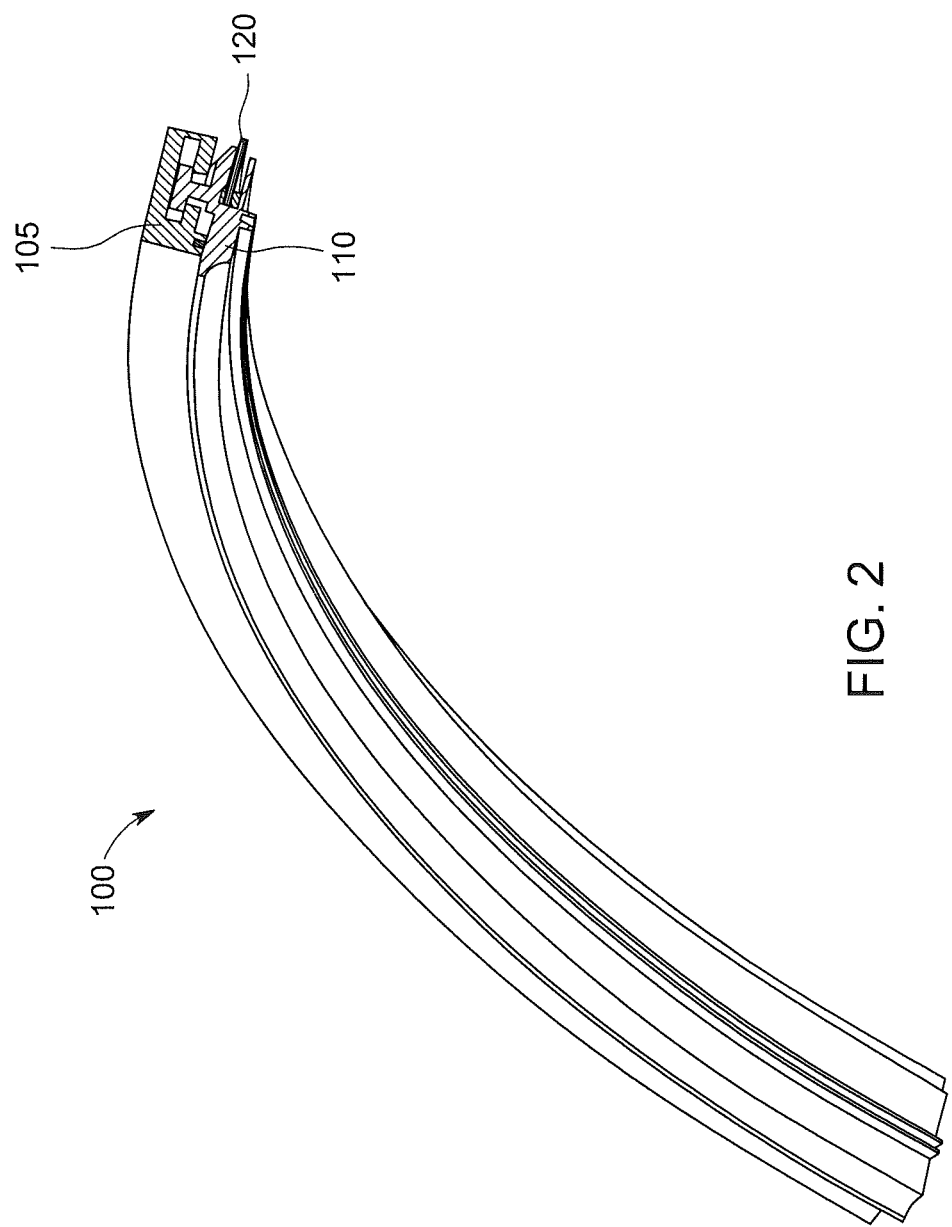
FIG. 2 illustrates another perspective side view of an exemplary axial brush seal assembly of FIG. 1.
Figure 3:
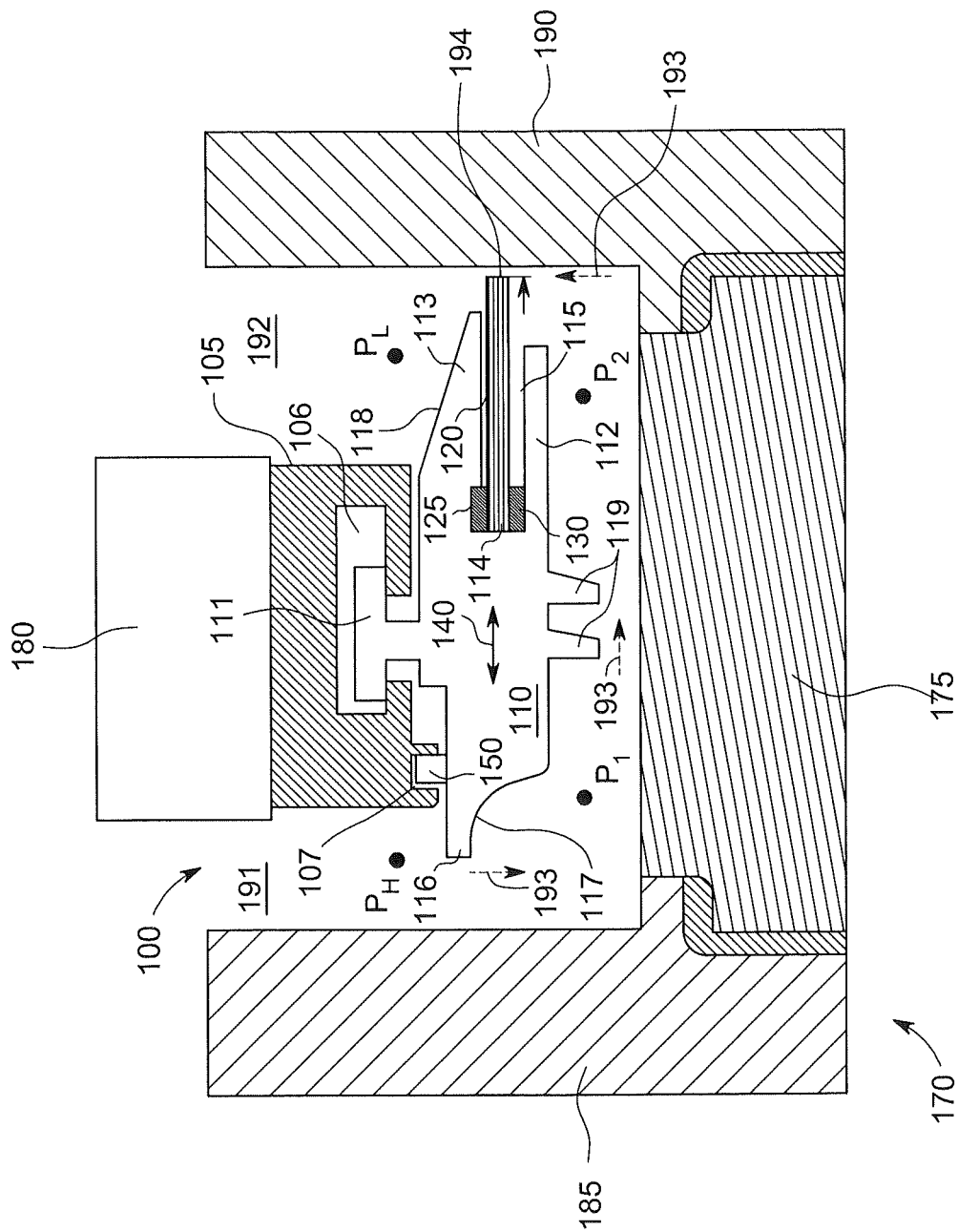
FIG. 3 illustrates a side view of the exemplary floating axial brush seal assembly of FIGS. 1 and 2 in a power turbine environment.

FIG. 1 illustrates a perspective side view of an exemplary axial brush seal assembly 100. FIG. 2 illustrates another perspective side view of an exemplary axial brush seal assembly 100. FIG. 3 illustrates a side view of the exemplary floating axial brush seal assembly 100 of FIG. 1 in a power turbine environment 170. The turbine environment 170 can include a rotor 175 disposed between a first turbine wheel 185, which can be an upstream higher pressure rotating blade assembly, and a second turbine wheel 190, which can be a lower pressure rotating blade assembly. The first and second turbine wheels 185, 190 can be part of any stage of a power turbine. Furthermore, the first and second turbine wheels 185, 190 and the rotor 175 rotate in unison.

The turbine environment 170 can further include a stator 180 disposed around and in opposition to the rotor 175. The turbine environment 170 further includes wheel spaces 191, 192. It is desirable to control pressure and fluid flow (shown by arrows 193) in the wheel spaces 191, 192 depending on desired turbine operation as discussed further herein. For example, it may be desirable to maintain a higher pressure in the wheel space 191 and a lower pressure in the wheel space 192. In exemplary embodiments, the floating axial brush seal assembly 100 responds and self-regulates to any desired pressure and fluid flow in the turbine environment 170.

The floating axial brush seal assembly 100 can include a stationary seal component 105 that is disposed on the stator 180 (e.g., directly attached to the stator). In exemplary embodiments, the stationary seal component 105 can be integral with the stator 180 or a separate piece that is affixed to the stator 180 (e.g., via welding). The floating axial brush seal assembly 100 can further include a floating seal component 110 coupled to the stationary seal component 105 via a hook 111 (e.g., a T-arrangement, dovetail arrangement, or the like) extending into recess 106. In exemplary embodiments, the floating seal component 110 can be coupled to the stationary seal component 105 by a T-arrangement of the recess 106 and the hook 111 in which the hook 111 can move axially within the recess (i.e., an axially floating arrangement) in response to relative movement between the rotor 175 and stator 180 and/or pressure changes in the turbine environment 170. As illustrated, the recess 106 is relatively larger than the hook 111 such that the hook 111 can move within the recess 111 in response to, for example, pressure changes within the turbine environment 170. The hook 111 has a sufficient size and complementary geometry to prevent it from dislodging from the recess 106, while allowing for an expected range of movement of the hook 111 within the recess 106. As is clearly understood by an artisan, the hook 111 can be formed from an extension from back plate 113 into recess 106, with a protrusion near the end of the extension such that the protrusion has a size that is larger than the opening to the recess.

The floating axial brush seal assembly 100 can further include a secondary seal 150 (e.g., piston ring) disposed between the stationary seal component 105 and the floating seal component 110. This secondary seal 150 can be in frictional contact with the floating seal component 110, e.g., to prevent unwanted leakage between the wheel spaces 191, 192. The secondary seal 150 can be disposed in a recess 107 on the stationary seal component 105. The secondary seal 150 sits within the recess 107 and is retained by frictional forces between the secondary seal 150 and the recess 107. The recess 107 is large enough to accommodate the secondary seal 150 that it houses. The secondary seal 150 is of sufficient size to withstand the pressure loads and stresses from the turbine environment 170. Heating due to frictional movement is low due to small axial and infrequent movement. To reduce wear of the secondary seal 150, the secondary seal 150 can be a suitable material to withstand the loads, pressures and temperatures of the turbine environment 170, including but not limited to cobalt-based alloys.

The floating seal component 110 can further include bristles 120 disposed between side rails 125, 130. The bristles 120 are further disposed between a front plate 112 and a back plate 113. In exemplary embodiments, the front plate 112 and the back plate 113 are integral parts of the floating seal component 110 and have a cylindrical shape. The bristles 120 and the side rails 125, 130 can be affixed in a recess 114 (e.g., in a dovetail, lip and groove, or other arrangement that secures the bristles 120 while allowing their bending toward and/or away from the wheel space 192) in the floating seal component 110. The bristles 120 can be maintained at a distance 194 (e.g., brush clearance) from the second turbine wheel 190. However, during turbine operation, pressure fluctuations within the turbine environment 170 can cause the bristles 120 to contact the second turbine wheel 190, thus bending the bristles 120. A gap 115 provides a space into which the bristles 120 can move (e.g., fan out) from bending. The bristles 120 are also circumferentially arranged about the rotor 175. The bristles 120 can be angled in a tangential direction, e.g., in order to provide flexibility to the bristles 120, allowing the bristles 120 to bend rather than buckle when the second turbine wheel 190 contacts the bristles 120.

The floating seal component 110 can also include a radial seal, such as a labyrinth seal having one or more teeth, designed such that it does not contact the rotating component (s).

In exemplary embodiments, the floating seal component 110 can include several geometric features that can influence the pressure and fluid flow in the wheel spaces 191, 192. For example, the floating seal component 110 can include an axial tooth 116, which can affect the fluid flow in the wheel space 191, thus contributing to a pressure drop between pressures $P_H$ and $P_1$. The pressure drop between $P_H$ and $P_1$ can also be influenced by an angle of a sloped portion 117 of the floating seal component 110. The sloped portion can be a shallow angle (e.g., 5 degrees to 20 degrees, specifically about ten degrees), for example, to create a tooth profile. The pressure drop across the sloped portion differs from application to application, and hence the angle is chosen based upon the specific application. The floating seal component 110 can further include radially oriented labyrinth teeth 119, which can affect the fluid flow between the wheel spaces 191, 192, thus contributing to a pressure drop between pressures $P_1$ and $P_2$. A pressure drop between $P_2$ and $P_L$ can be influenced by variances in the distance 194 between the bristles 120 and the second turbine wheel 190. A pressure balance can be maintained on the entire assembly 100 to maintain the bristles 120 within a tight clearance to the turbine wheel 190.

In steady state operation of the turbine environment 170, the floating axial brush seal assembly 100 can attain an equilibrium position in which the bristles 120 operate with minimal axial clearance to, or operate with light contact with, the second turbine wheel 190. At a given instance, pressures $P_H$, $P_1$, $P_2$, and $P_L$ act on the floating seal component 110, which causes movement generally in the directions represented by arrow 140.

In general, $P_H$ represents a high-pressure, whereas $P_L$ represents a low-pressure, measured relative to one another. Although the bristles 120 can be positioned on either of the low and high pressure sides, the bristles 120 can be maintained with increased clearance predictability on the low pressure side. As described herein, magnitudes of the pressures $P_1$ and $P_2$ depend on the axial distance between tooth 116 and wheel 185, the distance 194 between the bristles 120 and the second turbine wheel 190, as well as the radial clearance between the teeth 119 and rotor 175. In addition, $P_H > P_1 > P_2 > P_L$. The distance 194 during turbine operation is desired to be as low as possible without causing interference (e.g., frictional heating of the second turbine wheel 190) to provide effective sealing (e.g., between wheel spaces 191, 192). Brush distances 194 can be on the order of a few mils (e.g., less than or equal to 5 mils (0.127 millimeters (mm))).

During transient operation, turbine components undergo thermal expansion causing clearances to change and differential pressures to be established across the floating seal component 110. For example, the pressure differential causes the floating seal component 110 to follow movements of the second turbine wheel 190, thereby maintaining the distance 194 (ideally a low constant value) between the bristles 120 and the second turbine wheel 190. For example, as the rotor 175 thermally expands and moves axially relative to the stator 180, readjustments of pressures acting on the floating seal component 110 create a net force that moves the floating seal component 110 to corresponding relative locations within the turbine environment 170. In addition, when the turbine is shut down and the environment 170 depressurizes, the floating seal component 110 moves to a resting state. Similarly, when the turbine components thermally contract during the shut down operation, the pressure differential causes the floating seal component 110 to reverse its direction, thereby following the second turbine wheel 190, for example, and maintaining the desired clearance (i.e., the distance 194).

The forces acting within the turbine environment 170, and the resulting movement of the floating seal component 110 during transient operation is dependent on the dimensions of the floating axial brush seal assembly 100. For example, the angles of the sloped portions 117, 118 can be varied, i.e., chosen depending on the specific application. The pressure balance diameter as set by the secondary seal 150, affects the overall axial force balance, and can be adjusted to limit contact pressure between bristle tip of brush seal 120 and wheel 190. The pressure balance diameter is a diameter of the surface on which the secondary seal 150 acts, and can affect what part of the secondary seal 150 is exposed to higher pressure and what part of the secondary seal 150 is exposed to lower pressure. The secondary seal surface diameter divides the total axial area of the floating axial brush seal assembly 100 into two parts. The secondary seal surface diameter is the diameter of the secondary seal 150 that adjacent floating seal component 110. One part is subjected to pressure drop while the other part is not. As such, the diameter of the secondary seal 150 sets the pressure balance (or closing force of the seal). Referring again to FIG. 3, the larger the secondary seal surface diameter, the more surface area is exposed to high pressures $P_H$ and $P_1$, creating a larger net force in the wheel space 192. Similarly, a smaller secondary seal surface diameter reduces the net force in toward the wheel space 192, affecting the overall force balance on the floating seal component 110.

In addition, the number of radially oriented labyrinth teeth 119 can be chosen based upon a desired pressure drop from $P_1$ to $P_2$. The labyrinth teeth 119 can also have a shallow angle (e.g., about 5 degrees to about 20 degrees, specifically on the order of ten degrees). The number and length of the teeth can be selected on a per application basis, with the teeth generally having a length that will avoid contact with the rotor regardless of the movement of the floating seal component. In some embodiments, the floating seal component can have up to about 10 teeth, specifically, 1 to 5 teeth, and more specifically, 1 to 3 teeth. The distance between the labyrinth teeth can be selected to create an unfavorable flow path to inhibit leakage (e.g., the tooth spacing can be the same as the tooth length). As such, by modifying the features, and radial and axial dimensions of the floating seal component 110, the amount of movement of the floating seal component 110 as well as the distance 194 can be selected and therefore, controlled.

In exemplary embodiments, the secondary seal 150 is implemented to control fluid leakage between the wheel spaces 191, 192, thereby controlling flow along the arrows 193, thus having predictable pressures $P_H$, $P_1$, $P_2$, and $P_L$. In exemplary embodiments, the secondary seal 150 can be any suitable seal including but not limited to, a piston ring, c-seal, pressure balanced piston ring, metallic seal, v-seal, w-seal, brush seal, as well as combinations comprising at least one of the foregoing seals. In FIGS. 1-3, the secondary seal 150 is illustrated as a piston ring.

Figure 4:
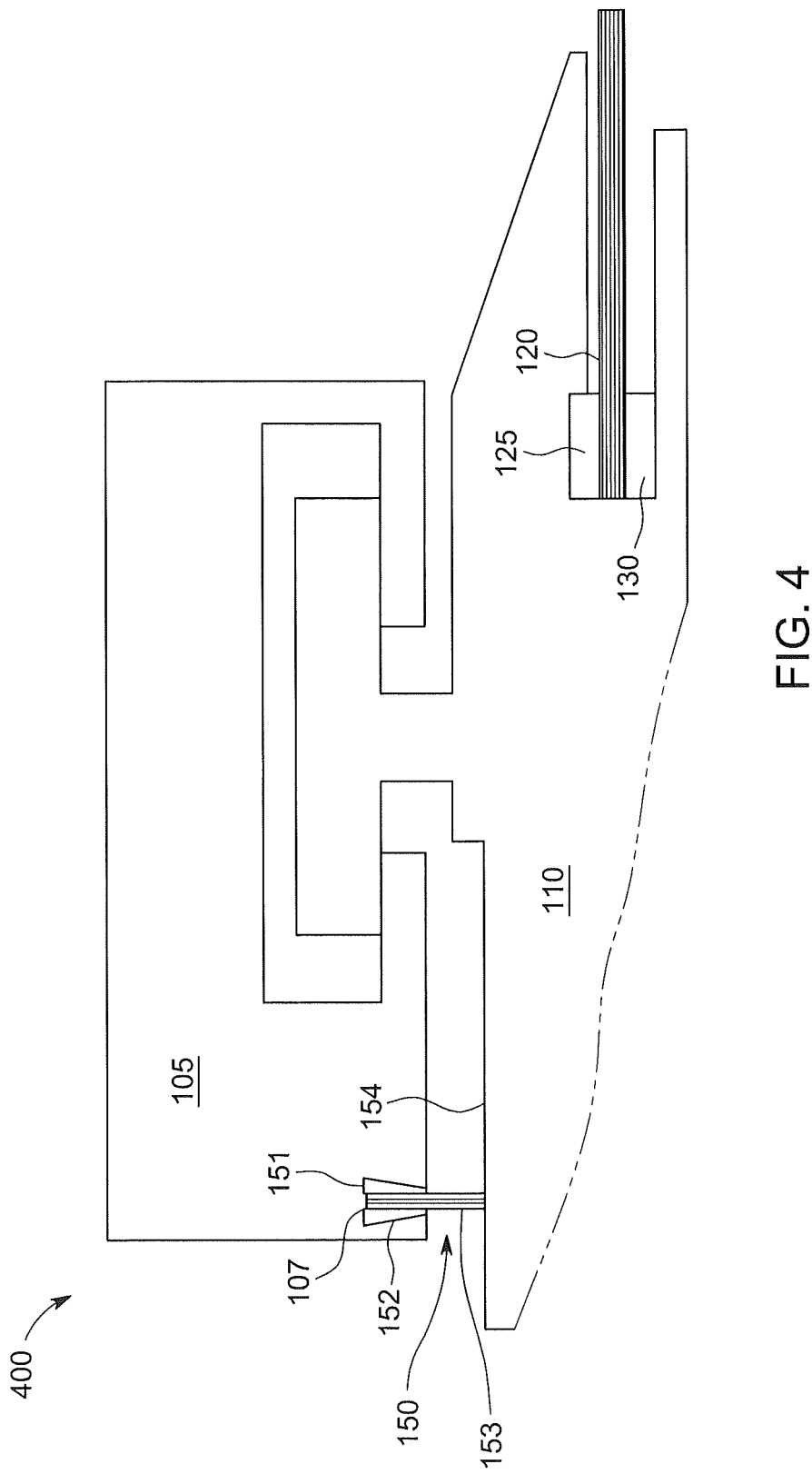
FIG. 4 illustrates a partial side view of another embodiment of a floating brush seal assembly.

FIG. 4 illustrates a partial side view of a floating axial brush seal assembly 400. FIG. 4 illustrates a partial view of the stationary seal component 105 and the floating seal component 110. FIG. 4 illustrates secondary seal 150 as a radial brush seal, which includes bristles 153 disposed between side rails 151, 152. The bristles 153 and the side rails 151, 152 can be affixed in the recess 107 of the stationary seal component 105 and in a dovetail arrangement with the recess 107. In exemplary embodiments, the bristles 153 are in frictional contact with a surface 154 of the floating seal component 110, thereby preventing leakage between the wheel spaces 191, 192 as described with respect to FIG. 3. The movement of the floating seal component 110 can be relatively small in both magnitude and rate, thus causing little frictional heating on the surface 154 of the floating seal component 110. As such, FIG. 4 illustrates that in exemplary embodiments, the floating axial brush seal assembly 100 can include two sets of brush seals, one including the bristles 120 and the other including the bristles 153. In such an arrangement, the bristles 120 are arranged axially with respect to the rotor 175 and the first and second turbine wheels 185, 190, and the bristles 153 are arranged radially with respect to the rotor 175 and the first and second turbine wheels 185, 190.

Materials for the assemblies 100, 400 as described herein can vary application to application. For example, depending on the temperature, the parts for the assemblies 100, 400 can be a metal or metal alloy, such as chromium, molybdenum, cobalt, vanadium, nickel, tungsten, as well as combinations comprising at least one of the foregoing. Exemplary alloys include cobalt base alloys, nickel base alloys, iron base alloys, chromium based alloys, and the like, such as steel. For example, a chromium, molybdenum, vanadium (CrMoV) steel could be employed for low temperatures (e.g., less than or equal to 1,000° F. (538° C.)), while a nickel alloy such as Inconel* could be employed for higher temperature applications (e.g., greater than 1,000° F. (538° C.)). Where there could be sliding friction such as the secondary seal 150 or brush seal bristles 120, materials such as a cobalt-based alloy can be employed, e.g., Haynes* 25 alloy (nickel-chromium-tungsten alloy) or Stellite* alloy (cobalt-chromium alloys). Sometimes the mating components might have a low-friction or wear-resistant coating such as chrome carbide. Ceramics can also optionally be used, e.g., for very high temperatures in some gas turbine applications.

The exemplary axial brush seal assemblies described herein offer several advantages. For example, in certain reaction-based turbine designs with a drum rotor construction, the turbine can include a much larger number of blade rows as opposed to an impulse-based designs), with the blades inserted into dovetails machined out of the rotor body (a drum rotor design, as opposed to a wheel and diaphragm type construction). For example, reaction-based steam turbines can have approximately two times the number of blades as an impulse turbine. This type of turbine depends heavily on effective sealing and has a limited radial space for seals (especially brush seals, which require a certain amount of radial bristle length in order to maintain their flexibility and compliance). The exemplary axial brush seal assemblies described herein provide the effective sealing without the need for radial space.

The exemplary axial brush seal assemblies can also improve turbine operability over other seal designs. Hi-lo teeth, a type of labyrinth seal, has been used to seal the gap between the rotor 175 surface and stator inner cover 105. In such arrangement, the radial teeth alternate long and short, and opposite alternating small and large diameter sections of the rotor (the rotor is machined with hi- and lo-land). The long labyrinth teeth engage the lo-land part of the rotor while the short teeth engage the hi-land of the rotor. The hi-land is typically about 0.125 inches (0.3175 centimeters) taller than the lo-land, meaning that the rotor diameter alternates by 0.25 inches (0.635 centimeters) in the seal section, while the labyrinth tooth length also alternates by 0.125 inches (0.3175 centimeters) (0.25 inches (0.635 centimeters) on diameter). The radial clearance between the teeth and the rotor is typically the same for both the short and long teeth; but by alternating the long and short teeth (i.e., the "hi-lo" arrangement), a more effective flow restriction is created. During startup, the rotor thermally expands faster than the casing, so the rotor lands move axially relative to the seal teeth. In order to prevent the rotor lands from interfering with (and damaging) the seal teeth, the rate of startup must be carefully controlled. The axial brush seal assemblies described herein eliminate axial-clearance-based start-up concerns because the axial brush seal assemblies "float" with the rotor, without concern for creating damaging axial rubs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brush seal assembly for turbomachinery having a rotor, comprising:
    a stationary seal component; and
    a floating seal component movably coupled to the stationary seal component via a hook extending into a recess of the stationary seal component, wherein the floating seal component comprises:
        a cylindrical front plate and a cylindrical back plate; and
        a plurality of bristles held between the cylindrical front plate and the cylindrical back plate;
    wherein, when installed in the turbomachinery, the plurality of bristles extend axially with respect to the rotor and are configured to bend towards or away from a turbine wheel.

2. The assembly as claimed in claim 1, further comprising a plurality of side rails affixed in a recess formed between the cylindrical front plate and the cylindrical back plate, for holding the plurality of bristles, wherein the plurality of side rails define a space between the plurality of bristles and the cylindrical front plate and between the plurality of bristles and the cylindrical back plate.

3. The assembly as claimed in claim 1, further comprising a secondary seal disposed between the stationary seal component and the floating seal component.

4. The assembly as claimed in claim 3, wherein the secondary seal comprises a piston ring.

5. The assembly as claimed in claim 3, wherein the secondary seal comprises a brush seal having another plurality of bristles, and wherein, when installed in the turbomachinery, the other plurality of bristles of the secondary seal extend radially with respect to the rotor.

6. A power turbine, comprising:
    a first turbine wheel;
    a second turbine wheel;
    a rotor disposed between and coupled to the first and second turbine wheels;
    a stator adjacent the rotor; and
    a brush seal assembly, the bush seal including:
        a stationary seal component attached to the stator;
        a floating seal component movably coupled to the stationary seal component via a hook extending into a recess of the stationary seal component, wherein the floating seal component comprises:
            a cylindrical front plate and a cylindrical back plate; and
            a plurality of bristles held between a plurality of side rails affixed in a recess formed between the cylindrical front plate and the cylindrical back plate, wherein, when installed in the turbomachinery, the plurality of bristles extend axially with respect to the rotor and are configured to bend towards or away from the second turbine wheel;
    and
        a piston ring disposed between the stationary seal component and the floating seal component.

7. The power turbine as claimed in claim 6, wherein the recess and the hook are in a floating dovetail arrangement.

* * * * *

UNITED STATES PATENT AND TRADEMARK OFFICE
CERTIFICATE OF CORRECTION

PATENT NO. : 8,777,563 B2  Page 1 of 1
APPLICATION NO. : 13/017540
DATED : July 15, 2014
INVENTOR(S) : Sarawate et al.

It is certified that error appears in the above-identified patent and that said Letters Patent is hereby corrected as shown below:

In the Specification

Column 1, Line 35, delete "bush" and insert -- brush --, therefor.

Column 1, Line 47, delete "bush" and insert -- brush --, therefor.

In the Claims

Column 8, Line 22, in Claim 6, delete "bush" and insert -- brush --, therefor.

Signed and Sealed this
Ninth Day of December, 2014

Michelle K. Lee
*Deputy Director of the United States Patent and Trademark Office*